United States Patent [19]
Buurman et al.

[11] 3,953,189
[45] Apr. 27, 1976

[54] APPARATUS FOR SHEARING AND TRANSFERRING A GLASS CHARGE

[75] Inventors: Herman Buurman; Hendrik Romberg, Eindhoven, both of Netherlands

[73] Assignee: U. S. Philips Corporation, New York, N.Y.

[22] Filed: Aug. 23, 1974

[21] Appl. No.: 500,035

Related U.S. Application Data

[62] Division of Ser. No. 403,099, Oct. 3, 1973, Pat. No. 3,868,240.

[30] Foreign Application Priority Data
Apr. 11, 1973 Netherlands .................... 7305030

[52] U.S. Cl. .................................. 65/207; 65/208; 65/221; 65/225; 65/241
[51] Int. Cl.² ...................... C03B 5/30; C03B 9/00
[58] Field of Search ............ 65/207, 241, 133, 208, 65/123, 122, 164, 221, 222, 323, 225, 127

[56] References Cited
UNITED STATES PATENTS

| | | |
|---|---|---|
| 1,711,818 | 5/1929 | Stuckey ............................ 65/127 X |
| 2,010,334 | 8/1935 | Stewart ................................. 65/127 |
| 2,263,126 | 11/1941 | Gray et al. ............................ 65/127 |
| 2,669,806 | 2/1954 | Van De Walle et al. ......... 65/164 X |
| 3,240,582 | 3/1966 | Stotske .............................. 65/123 X |
| 3,347,652 | 10/1967 | Giffen .............................. 65/323 X |

Primary Examiner—S. Leon Bashore
Assistant Examiner—Frank W. Miga
Attorney, Agent, or Firm—Frank R. Trifari

[57] ABSTRACT

Apparatus for manufacturing hollow glass articles, in which glass charges cut from a stream of molten glass are shaped into blanks which are transferred onto carriers and which are subsequently blown into hollow articles by a forming operation. Because, the shaped blanks are exclusively displaced according to a two-dimensional movement pattern of movement during their transfer to the carriers, the transport time of the blanks can be reduced so that the overall process can be performed more quickly.

7 Claims, 17 Drawing Figures

APPARATUS FOR SHEARING AND TRANSFERRING A GLASS CHARGE

This is a division of application Ser. No. 403,099, filed Oct. 3, 1973 now U.S. Pat. No. 3,868,240 issued Feb. 25, 1975.

The invention relates to a method of manufacturing hollow glass articles, in which glass charges are severed from a stream of molten glass, are seized in their free fall and shaped into blanks which are successively transferred onto the supporting surface of carriers which are travelling along a closed path and which are each provided with an orifice, the blanks being subsequently formed into hollow articles by the sagging of their central portion through the orifice of the carriers and by a subjection to a forming operation, the articles thus obtained being ultimately removed from the carriers.

Methods of this kind are used in particular for the manufacture of incandescent lamp bulbs, bottles, containers, table ware etc.

In a method of this kind which is described in U.S. Pat. No. 2,263,126, the blanks are transferred onto the carriers by a first displaced over a comparatively long path in a direction transverse to the movement of the carriers and by a subsequent second displacement in the direction of movement of the before their deposition on the carriers. Due to the long path and the change of the direction of movement of the blanks, the transport time is very long in comparison with the overall cycle of seizing the glass charge, shaping the charge into a blank, and transferring the blank onto a carrier.

The invention has for its object to provide a method in which the overall cycle may be performed faster and in which the transport time and the displacements are very short.

This object is achieved according to the invention mainly in that during their transfer onto the carriers the blanks are displaced, exclusively according to a two-dimensional movement pattern which extends partly parallel to the supporting surface of the carriers.

As a result, the blanks can be transferred onto the carriers over the shortest possible path over a smooth part without standstill, so that the transport time is substantially reduced and the entire process can be performed faster.

In a preferred embodiment of the method according to the invention, the movement pattern of the blanks is situated in a vertical plane which also forms a tangent plane with the path of movement described by the centre lines of the articles in the carriers.

As a result, in spite of the fact that their movement pattern is only two-dimensional, the blanks can be displaced such that their speed and direction of movement during deposition are the same as the circumferential speed and the direction of movement of the carriers, which results in a further reduction of the transport time.

A vertical tangent plane is to be understood to mean a vertical plane which is at least substantially tangential to the path followed by the centre lines of the openings in the carriers, that is to say within the tolerances permissible and commonly used in practice; these are in the order of 0.5% of the radius of the said closed path.

In another preferred embodiment of the method according to the invention, a minimum transport time and an optimum transport time/shaping time ratio is achieved in that the blanks are deposited on the carriers substantially at the instant at which the centre line of the orifices in the carriers passes the vertical tangent plane, the horizontal component of the movement pattern then having the same direction as the movement of the carriers during the passage past the tangent plane. Immediately after the pressing of the blanks, their speed and direction of displacement are progressively adapted to the circumferential speed and to the direction of movement of the carriers; undesired accelerations and decelerations are thus minimized.

The invention furthermore relates to a device for performing the method according to the invention. This device is provided, in the manner described in said U.S. Pat. No. 2,263,126, with a glass shear, a blank-shaping mechanism comprising two shaping cups, and a blowing unit comprising a series of carriers which are movable along a closed path and which are each provided with an orifice, said carriers being slidable, in a direction transverse to their direction of movement between a receiving position and a blowing position, the said blowing unit furthermore comprising blowing heads and blowing moulds which cooperate with the carriers. According to the invention this device is characterized in that the shaping cups are displaceable with their centre line in a vertical plane through the cutting point of the glass shear and tangentially to the path of movement described by the centre line of the orifices in the carriers in their receiving position. In contrast with the known device, the forming cups of the device according to the invention are displaceable in a single plane with the result that the blanks can be transferred to the blowing unit as quickly as possible, over an as short as possible distance, in an as short as possible transport time and with an as small as possible acceleration. The maximum production capacity of a device of this kind is mainly determined by the frequency at which the blanks can be transferred to be blowing unit. Because in the device according to the invention the successive cycles, i.e. seizing of a glass charge, shaping the glass charge into a blank, and transferring the blank to the blowing unit, can be performed at a very high frequency, the production capacity of the device amounts to more than 7000 products per hour, depending on the article to be manufactured; this is about 40% higher than the capacity of comparable devices.

In the said known device, the glass shear is adjustable vertically and the speeds of the glass shear and of the blank-shaping mechanism are controllable; however, the glass shear and the blank-shaping mechanism are arranged on the frame of the blowing unit. In contrast therewith, in the device according to the invention the glass shear and the blank-shaping mechanism constitute a common cutting-shaping unit, the blowing unit and the cutting-shaping unit being displaceable relative to each other and being driven at a synchronous speed, independent of each other.

The independent drive of the two units, enables optimum adaptation of their speeds to different articles. Because the glass shear and the blank-shaping mechanism constitute a common unit, the distance between the shear blades of the glass shear and the shaping cups of the blank-shaping mechanism can be minimized, so that the effect of uncontrolled variations of the cutting and seizing movements is minimized.

In a preferred embodiment of the device according to the invention, the cutting-shaping unit is adjustable vertically, the blowing unit being displaceable both in the vertical direction and in a direction transverse to the vertical plane of displacement of the shaping cups. By the vertical adjustment of the cutting-shaping unit the geometrical shape and the diameter of the glass charges to be cut off, can be influenced however, without changing the once adjusted distance between the shear blades and the shaping cups. By displacement in the vertical direction the blowing unit can be adjusted such that the blanks to be transferred approach the supporting surface of the carriers as closely as possible prior to their deposition. By displacement in the transverse direction the blowing unit can be adjusted with respect to the cutting-shaping unit such that the vertical plane of displacement of the forming dishes is practically tangent to the path of movement described by the centre line of the orifices in the carriers, taking into account the above mentioned tolerances which are admitted in practice.

Another preferred embodiment of the device according to the invention is characterized in that the cutting-shaping unit comprises a frame which is pivotable about a horizontal axis and which serves as a support for the glass shear, for the blank-shaping mechanism and for a drive mechanism, the glass shear comprising two shear blades connected to two shear arms driven by a first cam system, the blank-shaping mechanism comprising two shaping cups, guides for the shaping cups, and a second cam system for driving the shaping cups, the two cam systems being driven by the drive mechanism. Consequently, the cutting-shaping unit has a very compact construction and is readily adjustable.

In a further preferred embodiment of the device according to the invention, the shear arms are pivotable about a vertical axis, each shear arm being displaceable in a horizontal plane by means of a spring and an adjusting arm, each adjusting arm cooperating with an individual cam disc. The shear blades driven in this manner have a very simple and identical movement pattern, with the result that the cutting of the glass portions is properly reproducible and can be performed at a high frequency. The location of the shear works on the glass charges in the shaping cups and later on the blanks on the carriers can be influenced by adjustment of the shear arms with respect to each other by means of the adjusting arms.

Another preferred embodiment of the device according to the invention is characterized in that it comprises a single guide for the linear displacement of one shaping cup which acts as a die, the said guide being driven by a first cam disc, and two guides for the two-dimensional displacement of the second shaping cup which acts as a mould, said guides being driven by two further cam discs. The shaping cup acting as a die serves merely for intercepting the glass charges and for pressing the charges into blanks in cooperation with the other shaping cup acting as a mould; the transfer of the shaped blanks is performed exclusively by the second shaping cup, with the result that the mass which is to be displaced at a high speed and at a high frequency can be minimized.

In order to enable interception of the cut-off glass charges to be pressed into the desired shape at the correct instant, the interception instant must be variable with respect to the cutting instant. In a last preferred embodiment of the device according to the invention, this is readily possible in that the shear-driving cam discs are mounted on a first cam shaft, the cup-driving cam discs being mounted on a second cam shaft, each cam shaft being driven by a worm wheel which cooperates with a worm, one of the worms being journalled in an adjustable sleeve and being coupled to the other worm by way of a slide-key connection. The desired phase shift of the cutting motions of the shear blades and the seizing movements of the shaping cups can be accurately and simply adjusted by displacement of the adjustable sleeve.

The invention will be described in detail hereinafter with reference to the drawing.

Figure 1A:
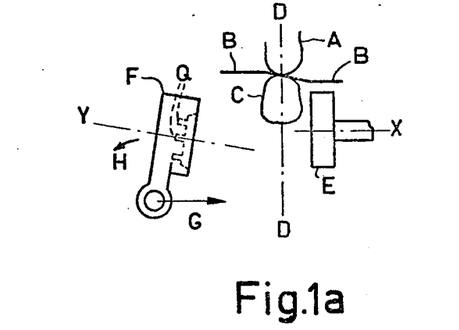
FIGS. 1a to 1h and 1k diagrammatically show a number of successive phases in the manufacture of a hollow glass article, using the method according to the invention.
Figure 1B:
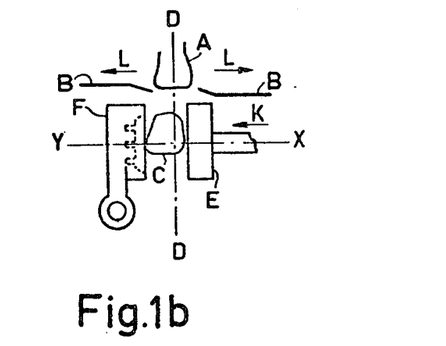
Figure 1C:
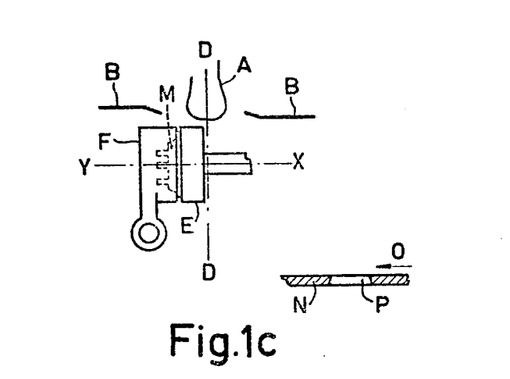

The method according to the invention will be described in detail with reference to the FIGS. 1a to 1k. FIG. 1a illustrates the cutting phase in which a glass charge C is cut from a stream of molten glass A by means of shear blades B; the reference D denotes the centre line of the glass stream A; a shaping cup E which acts as a die is stationary at this instant, while a mould-like shaping cup F performs a combined rotary and linear movement according to the arrows G and H in the direction of the die E. FIG. 1b shows the interception phase in which the cut off glass charge C is intercepted during its fall by the die E, linearly moving in the horizontal direction according to the arrow K, and is pressed into the mould F which is now stationary, while the shear blades B move to their rest position in the direction denoted by the arrows L. FIG. 1c shows the pressing and shaping of the intercepted glass charge into a blank M by the cups E and F; the reference N denotes a plate-like carrier which moves according to the arrow O in the direction of the centre line D and which is provided with an orifice P.

Figure 1D:
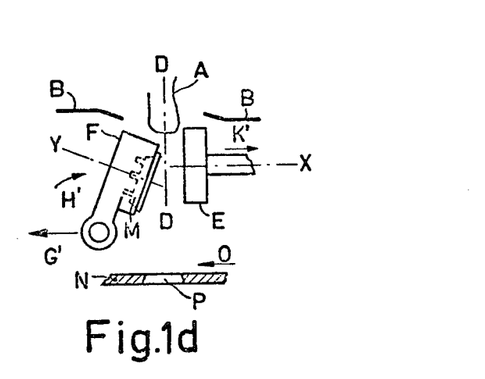
Figure 1E:
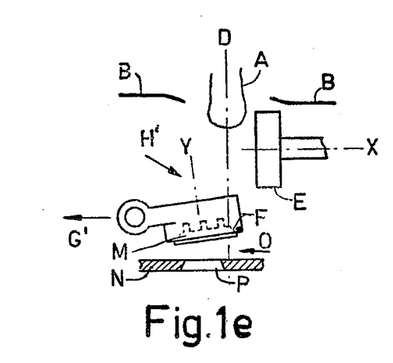
Figure 1F:
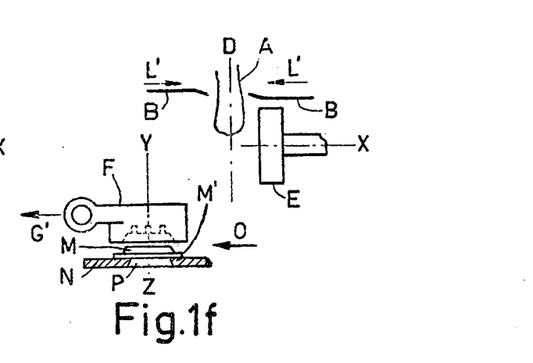
Figure 1G:
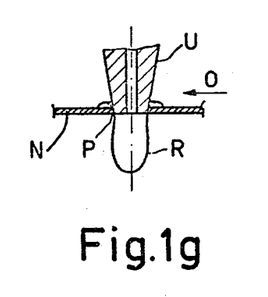

FIG. 1d shows the beginning of the transfer phase; die E returns in the horizontal direction according to the arrow K' to its rest position shown in FIG. 1a; the mould F performs a combined linear rotary movement according to the arrows G' and H' in the direction of the carrier N, which meanwhile has closely approached the centre line D of the glass stream A; during the transfer of the blank M it is held by vacuum in ducts Q (FIG. 1a) in the mould F. In the phase shown in FIG. 1e, the E is in the rest position, while the mould F still performs a combined rotary and linear movement; the carrier N has meanwhile passed the centre line D of the glass flow A. FIG. 1f shows the instant at which the blank M is deposited on the orifice P of the carrier N, the vacuum in the ducts Q of the mould F being removed and replaced by an overpressure; the mould F is then displaced in the horizontal direction only according to the arrow G' at a speed and in a direction which are the same as the speed and the direction of movement of the carrier N. The blank M now bears on the carrier with an edge portion M'. The shear blades B then start another cutting movement according to the arrows L', thus initiating a new cycle.

The die E and the mould F move with their centre lines X and Y, respectively, according to a movement pattern which is situated in a vertical plane through the centre line D of the glass stream A, that is to say the plane of the drawing; this plane also touches the path described by the centre line Z of the orifice P in the carrier N; in the situation shown in FIG. 1f, the centre line Z of the opening P passes through this vertical tangent plane during deposition of the blank M.

Figure 1H:
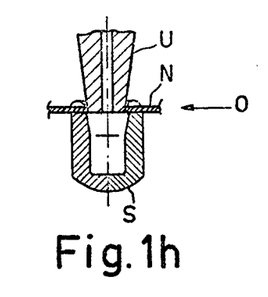
Figure 1K:
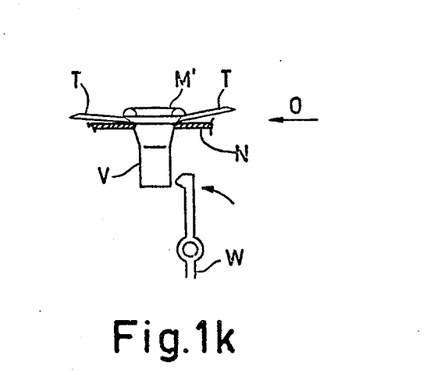

After the central portion of the blank M has sagged somewhat through the opening P of the carrier N, this portion is completely pressed through the opening P in known manner by means of a blowing head U and is blown to form a parison R. The parison is subsequently given its ultimate desired shape by means of a blowing mould S as shown in FIG. 1h. Subsequently, the edge portion M' of the original blank is removed from the carrier N by means of knives T, and the hollow glass article V thus obtained is removed from the carrier N by tapping with a hammer W.

The described phases, i.e. the cutting of a glass charge, the interception and the shaping of the glass charge into a blank, the transfer of the blank onto a carrier, and the formation of the blank into a hollow glass article, are performed in consecutive cycles at a high frequency.

Figure 2:
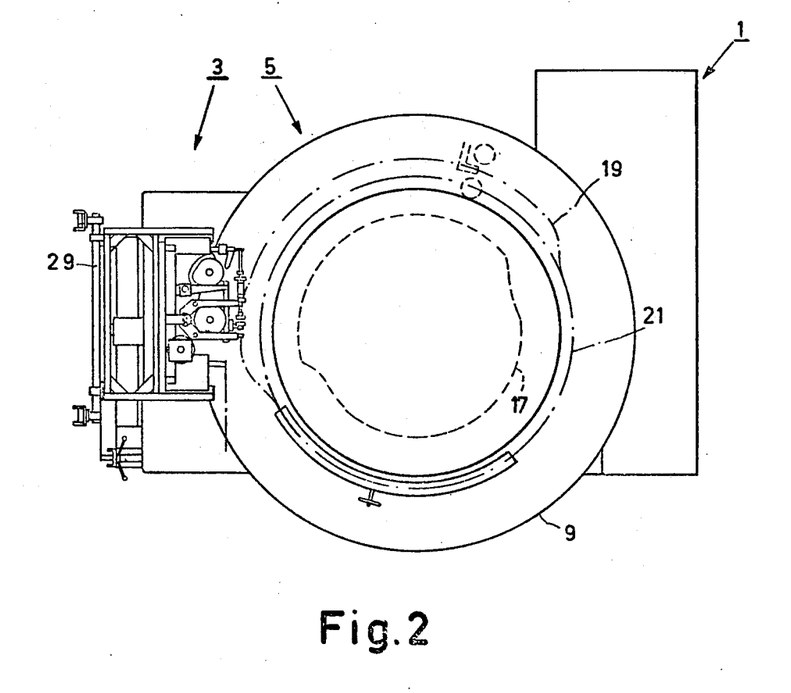
FIG. 2 is a plan view of an embodiment of the device according to the invention.
Figure 3:
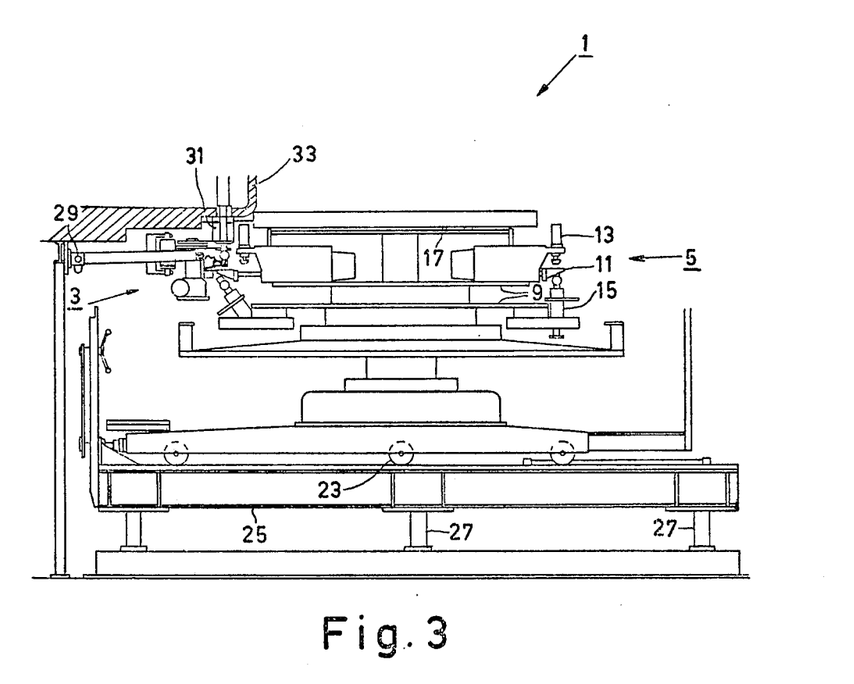
FIG. 3 is a partial side elevation of the device.

FIGS. 2 and 3 are a plan view and a side elevation, respectively, of a device for performing the method according to the invention, only the elements which are necessary for the understanding of the invention being shown. This device 1 mainly consists of a cutting-shaping unit 3 and a blowing unit 5; the two units are arranged separate from each other. The blowing unit comprises a rotary table 9 which is driven at a constant speed by a motor (not shown) and which comprises a series of plate-like carriers 11, each of which is provided with an orifice 12 (FIG. 5), and which cooperate with blowing heads 13 and pivotable blowing moulds 15. The carriers 11 are slidable, by way of a stationary cam disc 17, between a slid-out receiving position and a withdrawn blowing position such that the centre line 18 (FIG. 5) of their opening 12 follows the path denoted by the reference 19 in FIG. 2; during the taking-up of the glass blanks supplied by the cutting-shaping unit 3, the carriers 11 are in the receiving position (at the left in FIG. 3); during the blowing and forming operation of the blanks, the carriers are in the blowing position (at the right in FIG. 3) and complete, together with the blowing heads 13 and the blowing moulds 15, the path denoted by the reference 21 in FIG. 2.

The blowing unit 5 is provided with wheels 23 bearing on a frame 25 and is displaceable in the direction of the cutting-shaping unit 3. The frame 25 with the blowing unit 5 can be adjusted in the vertical direction by means of jacks 27. The cutting-shaping unit is arranged to be pivotable about a stationary shaft 29. The reference 31 denotes the outlet of a feeder 33 of a glass furnace not shown. The operation of the blowing unit 5 is known per se, so it need not be further described herein.

Figure 4:
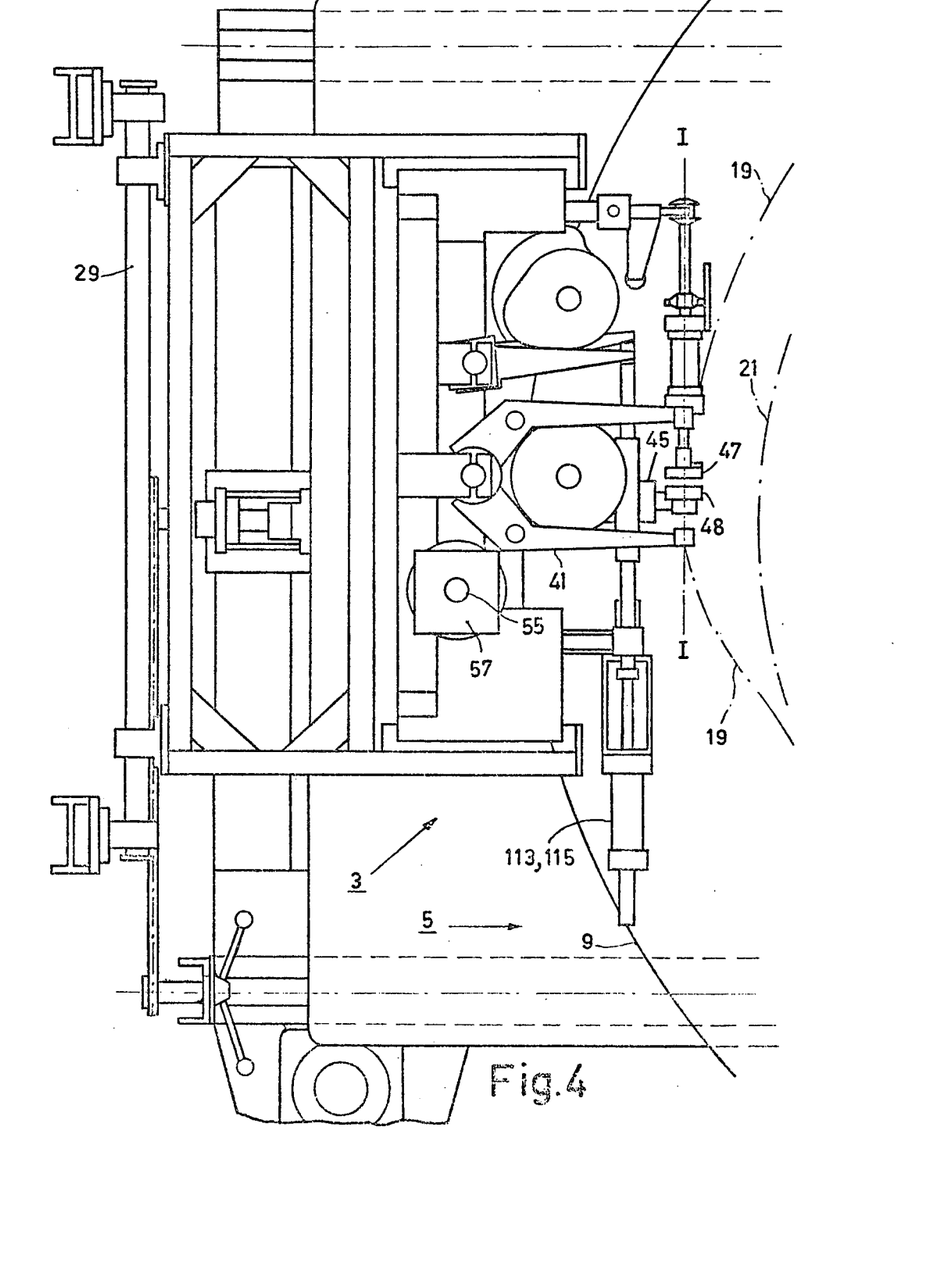
FIG. 4 is a plan view at an increased scale of a part of the device.
Figure 5:
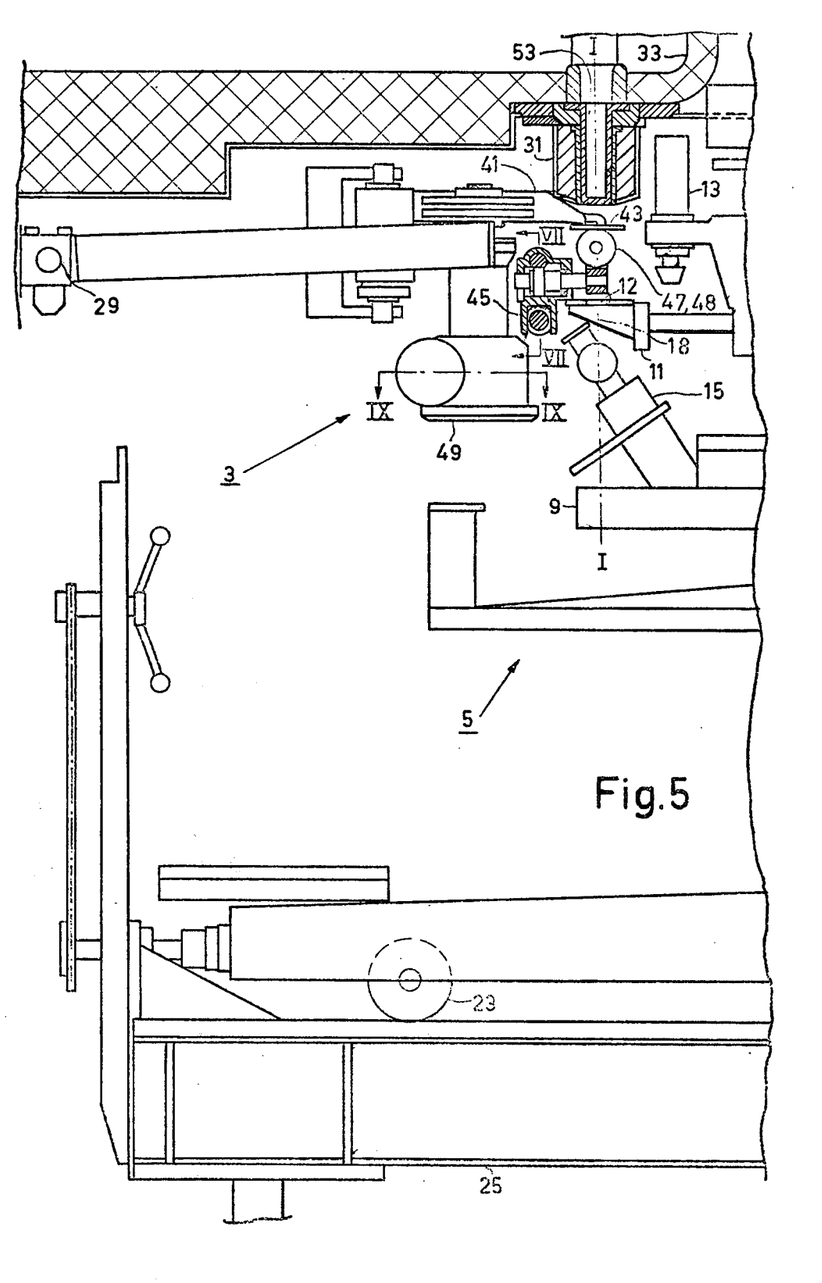
FIG. 5 is a side elevation of the part of the device shown in FIG. 4.

FIGS. 4 and 5 show, at an increased scale, the cutting-shaping unit 3 and a part of the blowing unit 5 in a plan view and in a side elevation, respectively, certain parts being omitted in FIG. 4 for the sake of clarity. The cutting-shaping unit 3, comprising a glass shear 41 with shear blades 43, a blank-shaping mechanism 45 with shaping cups 47 and 48 and a drive mechanism 49, is driven at a constant speed, synchronously with the blowing unit 5, by a motor not shown. The unit 3 is designed and arranged with respect to the outlet 31 of feeder 33 such that the cutting point of the shear blades 43, the movement pattern of the shaping cups 47 and 48, and the centre line of the discharge duct 53 in the outlet 31 are situated in one vertical plane I—I (FIG. 5). Using a nut 57 which cooperates with a threaded spindle 55, the cutting-shaping unit 3 can be pivoted about the shaft 29 and its level with respect to the outlet 31 of the feeder 33 can be adjusted. The blowing unit 5 can be adjusted in a direction transverse to the plane I—I such that the path 19 which is described by the centre lines 18 of the orifices 12 in the carriers 11 tanges the vertical plane I—I within the tolerances admitted in practice.

Figure 6:
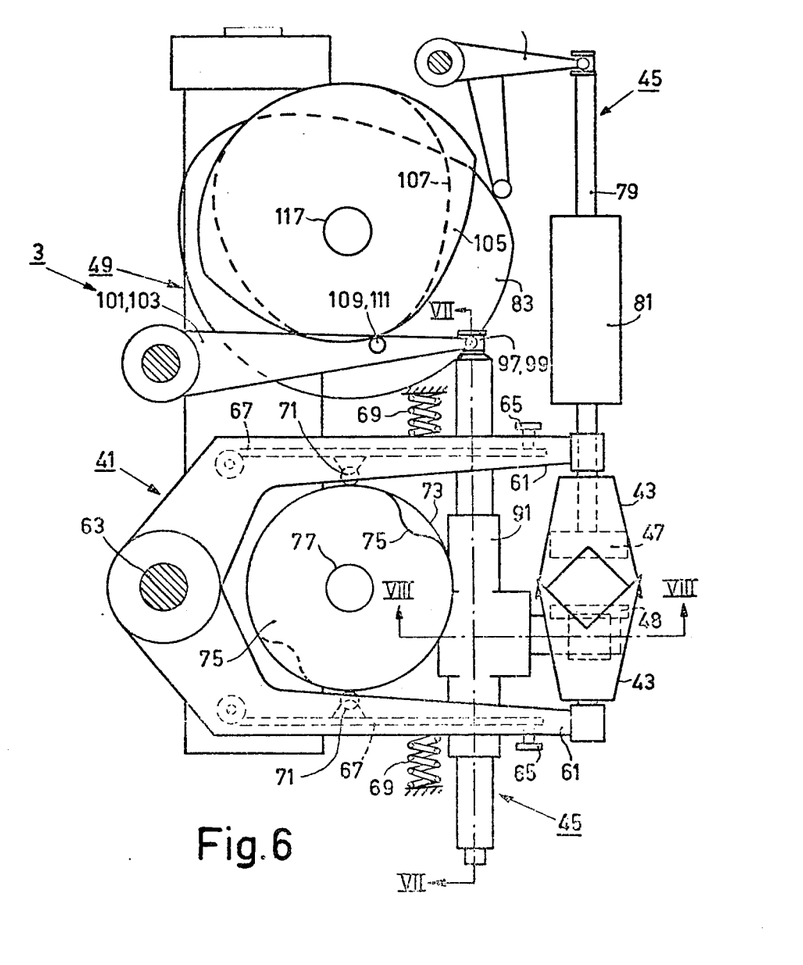
FIG. 6 is a plan view at an increased scale of the cutting-shaping unit.
Figure 7:
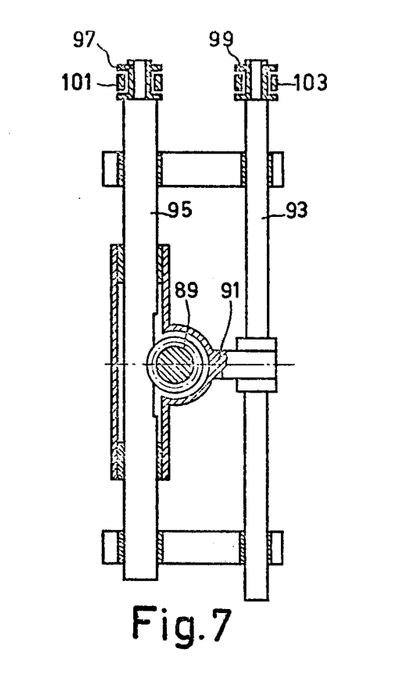
FIG. 7 is a longitudinal sectional view through the cutting-forming unit taken along the line VII—VII in the FIGS. 5 and 6.
Figure 8:
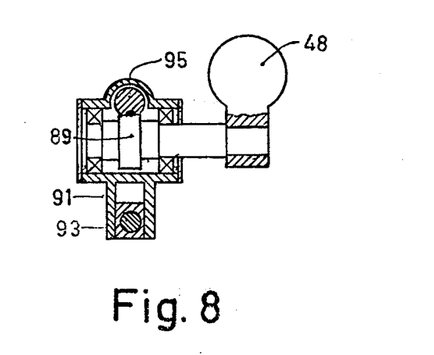
FIG. 8 is a cross-sectional view taken along the line VIII—VIII in FIG. 6.

FIG. 6 is a plan view of the cutting-shaping unit 3, comprising the glass shear 41, the blank-shaping mechanism 45 and the drive mechanism 49. The shear blades 43 are mounted on two shear arms 61 which are pivotable about a vercial shaft 63. Each shear arm is provided with an adjusting bolt 65 and an adjusting arm 67. Springs 69 press the shear arms 61 with the bolts 65 against the adjusting arms 67 which cooperate, via a cam roller 71, with cam discs 73, 75 on a cam shaft 77. The stroke of the shear blades 43 can be adjusted by means of the bolts 65. The blank-shaping mechanism 45 comprises two shaping cups 47 and 48, the cup 47 being constructed as a die and the cup 48 as a mould. The cup 47, performing only a linear movement, is connected to a rod 79 which is guided in a air cylinder 81 acting as a spring and is actuated by a cam disc 83 via a lever 85. As is shown in the FIGS. 7 and 8, the mould 48 is connected to a gearwheel 89 which is journalled in a sleeve 91. The sleeve 91 is mounted on a sleeve shaft 93 and reciprocates on a displaceable rack shaft 95. If the two shafts 93 and 95 move at the same speed in the same direction, the cup 48 is displaced in the same direction, without rotation. If a speed difference exists between the two shafts 93 and 95, the cup 48 will perform a linear and a rotary movement. The shafts 93 and 95 are provided with a grooved ring 97 and 99, respectively, which cooperate with the forked ends of levers 101 and 103, respectively. The levers 101 and 103 with the shafts 93 and 95 are displaced by cam discs 105 and 107 via cam rollers 109 and 111 and by air cylinders 113 and 115 (FIG. 4). The cam discs 83, 105 and 107 are mounted on a common cam shaft 117.

Figure 9:
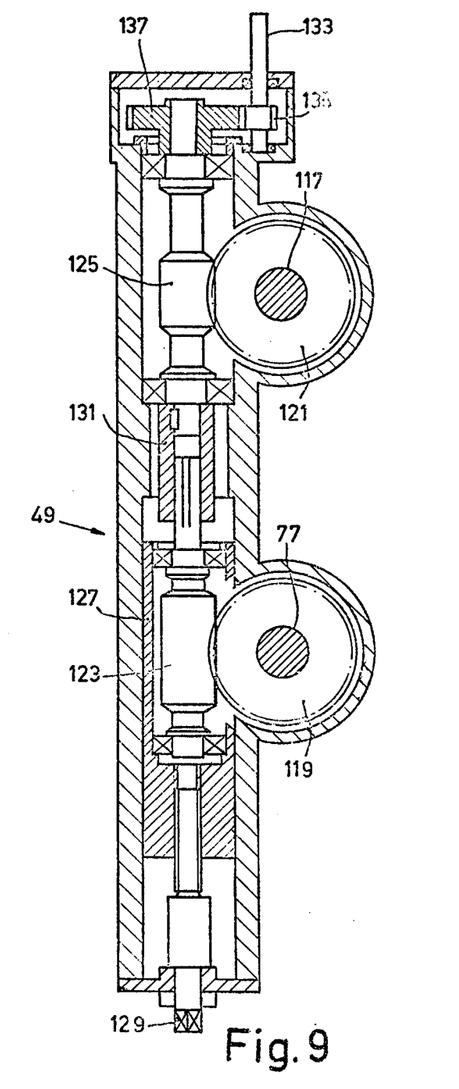
FIG. 9 is a sectional view taken along the line IX—IX in FIG. 5.

FIG. 9 is a sectional view through the drive mechanism 49 of the cutting-shaping unit 3. Mounted on the cam shafts 77 and 117 are worm wheels 119 and 121 which cooperate with worms 123 and 125, respectively. One of the worms, i.e. the shear-driving worm 123 in the embodiment shown, is journalled in a sleeve 127 which can be displaced in the axial direction by means of an adjusting screw 129. The shear-driving worm 123 is coupled to the cup-driving worm 125 by way of a slide-key connection 131. The worm 125 is driven via the drive shaft 133 and the gearwheels 135 and 137. If the worm 123 is pulled in the longitudinal direction, an angular shift occurs of the worm sheel 119 with respect to the worm wheel 121, and hence a phase shift drive of the glass shear 41 and the blank-shaping mechanism 45.

Using the method and the device according to the invention, hollow glass articles can be manufactured at frequencies which could not be realized by means of similar devices known thus far. Prolonged tests have demonstrated that the device is very reliable as a result of its comparatively simple but very efficient construction. Therefore, the device according to the invention fills a void between the known caroussel machines having a comparatively low production capacity and the so-termed ribbon machines which have a high capacity but which require very high investments while their capacity often far exceeds the required capacity.

We claim:

1. Apparatus for producing formed hollow articles comprising:
    means for producing a molten stream of glass;
    a glass shear for severing a glass charge from said molten stream;
    a blank shaping mechanism comprising two shaping cups, said shaping mechanism including first means for controlling said cups for intercepting and seizing said severed glass charge, said first means sequentially positioning said cups (1) on opposite sides of a plane extending through said stream and (2) on the same side of a said plane;
    and means for blowing glass including a series of carriers, means for moving said carriers along a closed path, each of said carriers including a generally planar horizontal member being provided with an orifice, said carrier being movable in a second direction generally transverse to their direction of movement in said closed path, said second direction also being generally transverse to said plane during at least a part of said closed path, means for moving said carriers sequentially in said generally transverse direction between a receiving position and a blowing position, said means for blowing also including a blowing head and a blowing mold and means for periodically registering said blowing head and said blowing mold with each of said orifices of each of said carriers when said carrier is disposed in said blowing position, said first means periodically positioning one of said cups in registered relationship to one of said orifices in one of said carriers disposed in said receiving position.

2. Apparatus as claimed in claim 1 wherein said means for providing a molten stream of glass is positioned above said glass shear and said glass shear is above said blank shaping mechanism, said apparatus further includes means to adjust the glass shear vertically and means for controlling the speeds of the glass shear and the blank-shaping mechanism constitute a cutting-shaping unit, said means for blowing and said cutting shaping unit being displaceable relative to each other, such apparatus further including means for driving at a synchronous speed, independent of each other said means for blowing and said cutting-shaping unit.

3. Apparatus as claimed in claim 1 wherein said means for blowing is displaceable both in the vertical direction and in a direction generally parallel to said closed path.

4. Apparatus as claimed in claim 2 wherein said cutting-shaping unit comprises a frame which is pivotable about a horizontal axis and which serves as a support for said glass shear, and for the blank-shaping mechanism, said glass shear comprising two shear blades connected to two shear arms driven by a first means for camming, said blank shaping mechanism comprising said two shaping cups, guides for said shaping cups, and a second means for camming said shaping cups, said apparatus further including a drive mechanism driving both of said cam systems and carried on said support.

5. Apparatus as claimed in claim 4 wherein said shear arms are pivotable about a vertical axis, each shear arm being displaceable in a horizontal plane by means of a spring and an adjusting arm, each first means for camming including a first cam disc cooperating with said adjusting arm.

6. Apparatus as in claim 4 also further including a single guide for the linear displacement of one shaping cup which acts as a die, a first cam disc driving said single guide, two guides for constraining two-dimensional movement of said second shaping cup which acts as a mold, and two additional cam discs driving said two guides.

7. Apparatus as in claim 4 further including first and second cam shafts, and first and second cooperating worm wheels and worms said first means for camming being mounted on said first cam shaft, said second means for caming being mounted on said second cam shaft, each of said cam shafts being driven by one said operating worm wheels and worms one of said worms being journalled in an adjustable sleeve and being coupled to the other worm by way of a slide-key connection.

* * * * *